United States Patent [19]

Takahashi

[11] Patent Number: 4,954,967
[45] Date of Patent: Sep. 4, 1990

[54] INFORMATION PROCESSING APPARATUS

[75] Inventor: Hiroshi Takahashi, Yokohama, Japan

[73] Assignee: Canon Kabushiki Kaisha, Tokyo, Japan

[21] Appl. No.: 455,908

[22] Filed: Dec. 20, 1989

[30] Foreign Application Priority Data

Sep. 21, 1983 [JP] Japan ............... 58-173155

[51] Int. Cl.$^5$ .................................. G06F 15/40
[52] U.S. Cl. ................... 364/518; 364/521; 340/712; 341/27; 341/33
[58] Field of Search ............ 364/518, 521, 188–190, 364/710.01–710.14; 341/27, 31, 33, 35; 340/710, 712

[56] References Cited

U.S. PATENT DOCUMENTS

| 3,729,129 | 4/1973 | Fletcher et al. | 364/518 |
| 4,071,691 | 1/1978 | Pepper, Jr. | 340/365 C X |
| 4,122,438 | 10/1978 | Bird | 340/365 P X |
| 4,221,975 | 9/1980 | Ledniczki et al. | 340/365 C X |
| 4,302,011 | 11/1981 | Pepper, Jr. | 340/365 C |
| 4,365,243 | 12/1982 | Perotto et al. | 340/712 |
| 4,413,314 | 11/1983 | Slater | 364/138 X |
| 4,421,418 | 12/1983 | Morishima | 368/69 |
| 4,495,651 | 1/1985 | Froeliger | 341/33 X |
| 4,504,920 | 3/1985 | Mickowski | 364/550 |
| 4,529,968 | 7/1985 | Hilsum et al. | 340/712 |
| 4,561,049 | 12/1985 | Deleganes et al. | 340/710 |
| 4,565,999 | 1/1986 | King et al. | 340/706 |
| 4,566,001 | 1/1986 | Moore et al. | 340/365 VL X |
| 4,567,480 | 1/1986 | Blanchard | 340/712 |
| 4,578,674 | 3/1986 | Baker et al. | 340/710 |
| 4,586,035 | 4/1986 | Baker et al. | 340/365 VL X |
| 4,758,830 | 7/1988 | Levien | 340/712 |

FOREIGN PATENT DOCUMENTS 0150904 8/1985 European Pat. Off. ........... 340/709

OTHER PUBLICATIONS

Flynn, "Control Panels: From Pushbuttons to Keyboards to Touchscreens", *Control Engineering*, Jun. 1984.

Primary Examiner—Parshotam S. Lall
Assistant Examiner—Joseph L. Dixon
Attorney, Agent, or Firm—Fitzpatrick, Cella, Harper & Scinto

[57] ABSTRACT

An information processing apparatus includes an input means having a plurality of switches arranged thereon, the direction of the sequential actuation of the switches is detected to determine a scrolling direction of movement of information. Marks are provided on a display to indicate the direction of scrolling. The display of information is controlled in accordance with the direction of movement of the information. Scrolling the information is inhibited when the direction of actuation of the switches conflicts with a predetermined scroll direction. Scrolling velocity may be controlled by the speed with which switches at the position of each mark are actuated.

19 Claims, 5 Drawing Sheets

INFORMATION PROCESSING APPARATUS

This application is a continuation of application Ser. No. 133,256, filed Dec. 14, 1987, which was a continuation of application Ser. No. 648,956, filed Sept. 10, 1984, both now abandoned.

BACKGROUND OF THE INVENTION

1. Field of the Invention

The present invention relates to an information processing apparatus which allows easy scrolling on a display screen without misoperation.

2. Description of the Prior Art

In a conventional computer, in order to display a large volume of data on a display screen having a limited display capacity, the data to be displayed on the display is vertically scrolled by depressing a "scroll" key on a keyboard located remote from the display. However, manipulation of keys which are remote from the display screen is difficult and misoperations occur frequently. For an unexperienced operator, it is necessary to alternately watch the keyboard and the display screen. This is not only troublesome but also induces misoperation.

SUMMARY OF THE INVENTION

It is an object of the present invention to provide an information processing apparatus having a scrolling function which is easy to use and reduces misoperation.

DETAILED DESCRIPTION OF THE PRERERRED EMBODIMENT

One embodiment of the present invention is explained in detail with reference to the drawings.

Figure 1:
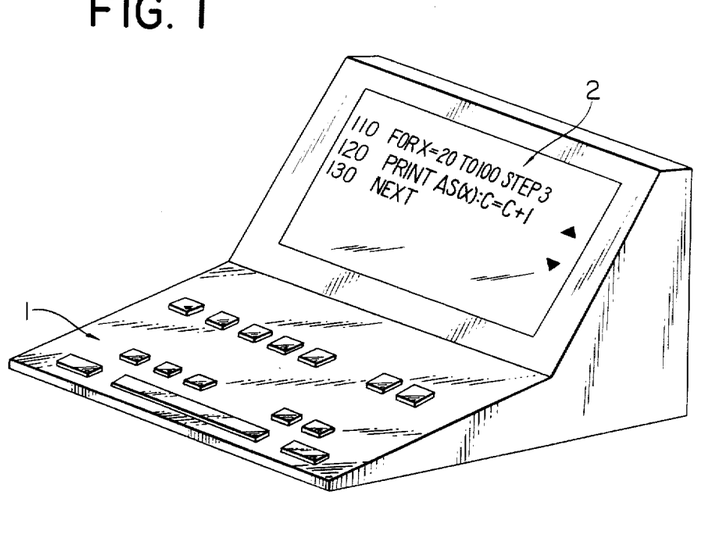
FIG. 1 is an external view of one embodiment of the present invention.
Figure 2:
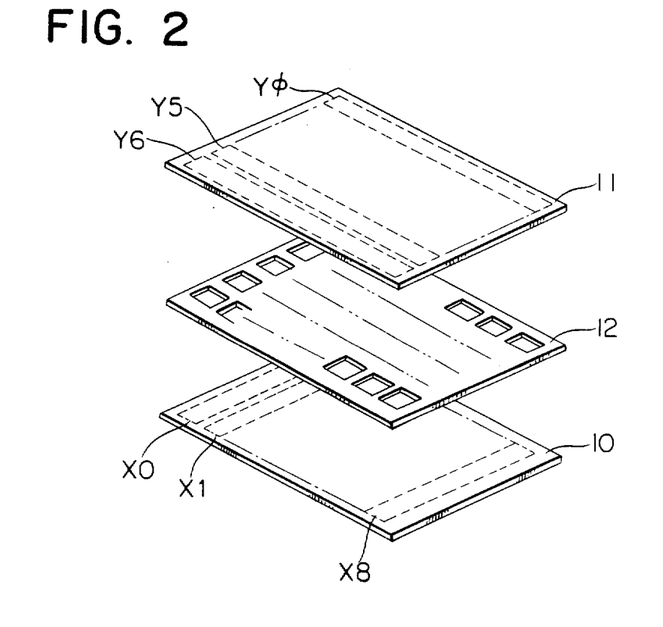
FIG. 2 shows a structure of a display keyboard of the present embodiment.

FIG. 1 is an external view of a small computer having a scroll function of a display device in accordance with the present invention. An input unit has a keyboard (KBD) 1 of a conventional typewriter arrangement, and an input/output device has a display/keyboard (DKB) 2 which comprises a liquid crystal display and a matrix contact having transparent thin film electrodes vapor-deposited in a matrix on a liquid crystal panel of the liquid crystal display. A detail of the DKB 2 is shown in FIG. 2.

Numeral 10 denotes a liquid crystal display (LCD) having transparent thin film electrodes X0 - X8 arranged on a conventional liquid crystal panel, numeral 11 denotes a flexible panel (FP) having transparent thin film electrodes Y0 - Y6 arranged on a transparent and flexible Mylar film, and numeral 12 denotes an insulative spacer (SP) made of generally light transmitting electrical insulating material having apertures formed at crosspoints of the electrodes X and Y of the LCD 10 and the FP 11.

Figure 3:
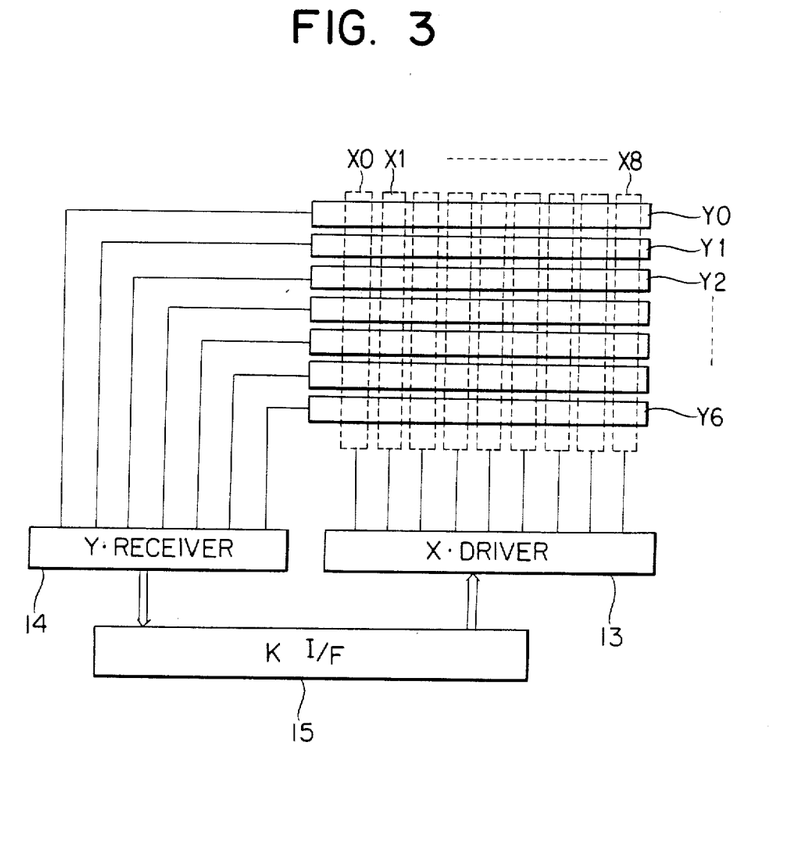
FIG. 3 shows a configuration of a matrix contact of the display keyboard of FIG. 2.

FIG. 3 shows a block diagram of the matrix contact of the DKB 2. Numeral 13 denotes an X driver which sequentially drives the X electrodes, numeral 14 denotes a Y receiver which sequentially scans the Y electrodes to check whether the drive signal of the X driver 13 reached the Y electrodes, and numeral 15 denotes a key interface (KI/F) which controls the X driver 13 and the Y receiver 14.

The electrodes X0 - X8 of the X electrode are sequentially scanned by the X driver 13 under control of the KI/F 15. The drive signal of the X driver 13 is propagated to the Y electrode through the contact area of the X electrode and the Y electrode and supplied to the KI/F 15 by the Y receiver 14.

Namely, the KI/F 15 supplies the scan signal to the X driver 13 to read out the contact status from the Y receiver 14.

Figure 4:
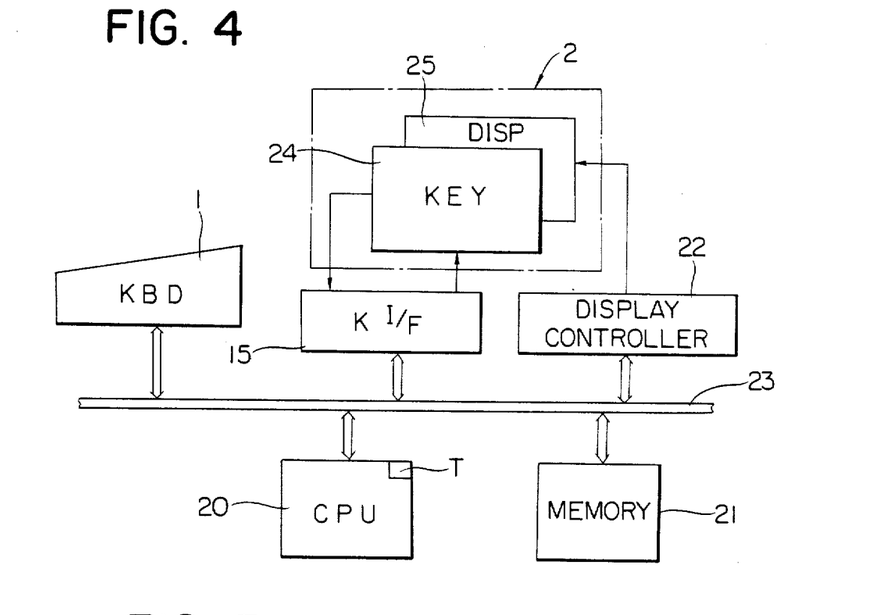
FIG. 4 is a block diagram of the present embodiment.

FIG. 4 is a block diagram of the small computer of the present embodiment. Numeral 20 denotes a central processing unit (CPU) for processing various information, numeral 21 denotes a memory which stores a control program for the CPU 20, numeral 22 denotes a display controller which controls liquid crystal display of the LCD 10 of the DKB 2, numeral 24 denotes the matrix contact (KEY) of the DKB 2, and numeral 25 denotes a liquid crystal unit (DISP) of the LCD 10 controlled by the display controller 22.

Common elements in FIGS. 1 and 3 are designated by the like numerals. Numeral 23 denotes a bus which connects the CPU 20 to the input/output controllers.

In the present embodiment, the CPU 20 controls inputting and outputting of the key input information from the KBD 1, the display information to the display controller 22 and the input information of the KEY 24 from the KI/F 15, in accordance with the control program stored in the memory 21.

Figure 5:
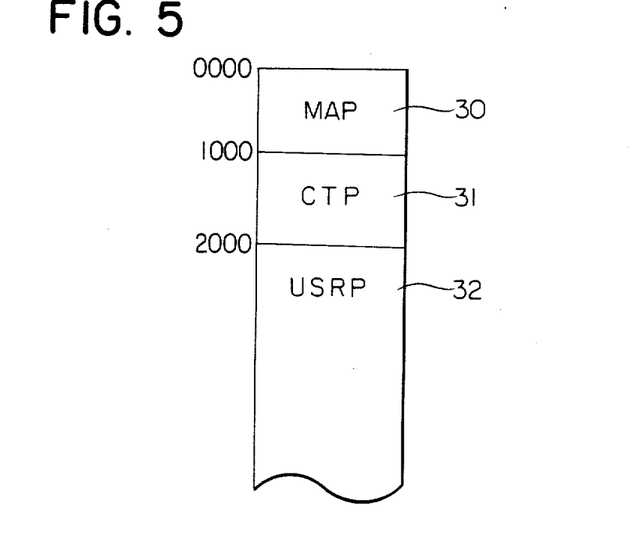
FIG. 5 shows a memory map of a memory of the present embodiment.

An example of the program of the CPU 20 stored in the memory 21 is shown in FIG. 5.

Numeral 30 denotes a manipulation analysis program (MAP) which monitors and checks the key status and the contact status of the KBD 1 and the KEY 24. It includes a program for determining movement of hands and fingers of an operation based on combination and depression sequence of the key contacts of the KEY 24 and converting it to a control instruction for the CPU 20.

Numeral 31 denotes a command transaction program (CTP) for causing the CPU 20 to execute commands generated by the key contact input information from the MAP 30 and commands from a user program (USRP) 32.

The scroll operation of the present embodiment is now explained.

Figure 6A:
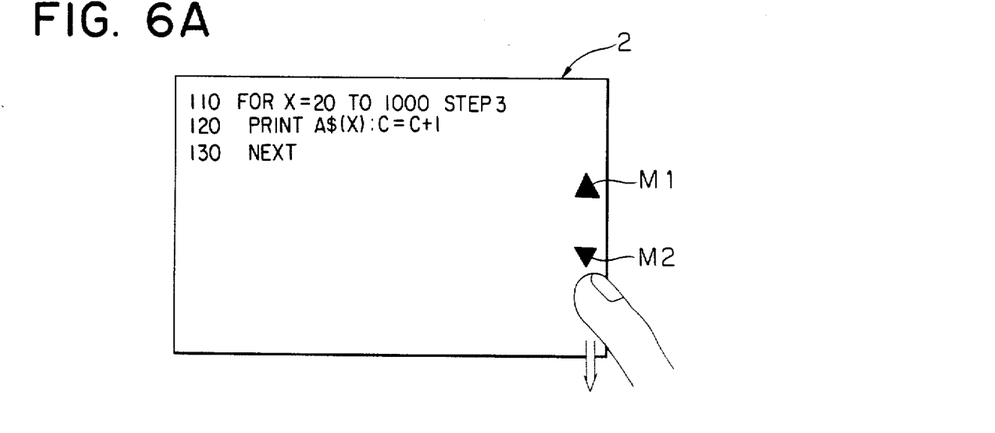
FIG. 6A shows an example of display of a program and illustrates a manipulation of the present embodiment.

In FIG. 6A, a portion of a program under edition by an operator is displayed on the DKB 2. Two marks ▲(M1) and ▼(M2) are displayed on right edge of the display. They are automatically displayed on the right edge by the CPU 20 during the display of the program. Because a long program such as one shown in FIG. 6B cannot be simultaneously displayed on the screen but only a portion of the series of program in a range defined by a window WD can be displayed, it is necessary to shift the window WD to search a desired portion.

Figure 6B:
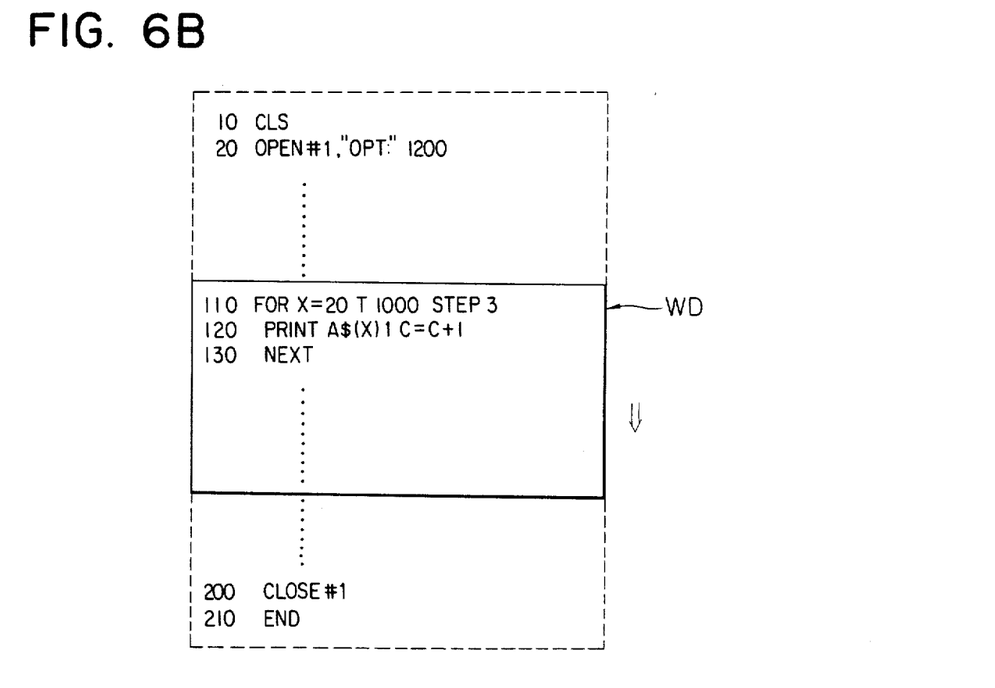
FIG. 6B shows a window for displaying the program.

Accordingly, it is necessary for the operator to instruct the direction of movement of the window WD.

In the present embodiment, the window WD is moved upward by upwardly rubbing the vicinity of the marks ▲(M1) and ▼(M2) on the right edge of the DKB by a finger or a palm, and the window WD is moved downward by downwardly rubbing the marks (as shown in FIG. 6A). The CPU 20 analyzes the manipulation by the MAP 30.

When the operator depresses a certain location on the DKB 2, the X electrode and the Y electrode corresponding to that location contact through the aperture formed in the SP 12. For example, if the operator depresses the point of the matrix contact (X8, Y1) of the KEY 24 and the operator moves his finger downward, the number n of Yn which contact with the Y electrode on the X8 sequentially increases like (X8, Y2), (X8, Y3), ...... The rate of increse of Yn is proportional to the movement of the finger of the operator, and the velocity of the finger or the rate of variation of Yn can be detected simultaneously.

Figure 7:
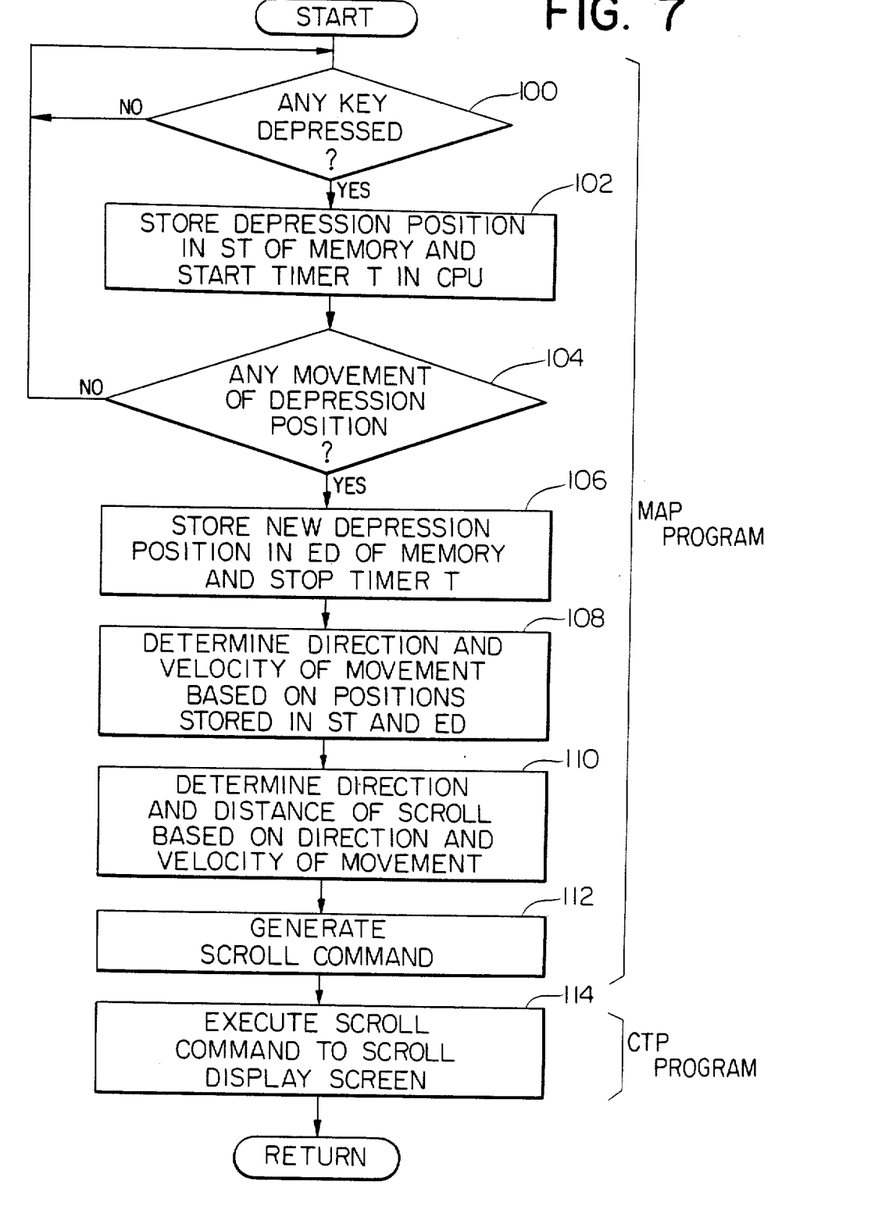
FIG. 7 is a flow chart showing a scroll procedure in the present embodiment.

The operation of the CPU 20 when the KEY 24 of the DKB 2 is depressed is explained with reference to a flow chart of FIG. 7.

In a step 100, the presence or absence of a matrix contact depression input of the KEY 24 is checked, and if the input and a closed contact point are present, the depression position is stored in the ST of the memory 21 and a timer T in the CPU is started in a step 102. In a step 104, the movement of the depression position is checked, and if no movement has ocurred, the process returns to the step 100 and waits for the movement of the depression position. If the depression position is moved and the closed contact position is changed, the process proceeds to a step 106 to store the new depression position in the ED of the memory 21 and stop the timer T. In a step 108, the direction of movement is determined based on the positions stored in the ST and the ED of the memory 21 and the velocity of the movement is determined based on the positions stored in the ST and the ED of the memory 21 and the count in the timer T. In a step 110, a direction of scroll is determined based on the direction of movement and a distance of scroll is determined based on the velocity of the movement. If the direction of the movement is not substantially vertical, the scrolling is not effected. In a step 112, a scroll command is generated.

The steps 100 to 112 are contained in the MAP 30.

In a step 114, the scroll command generated in the step 112 is executed to scroll the display on the DISP 25. It is carried out by the CTP program 31.

The process again returns to the step 100 and executes the next steps.

As described above, the display information on the screen can be scrolled by depressing the display screen by the finger and moving the finger in the direction of scroll without inputting the scroll command from the KBD 1. Accordingly, the burden to the operator due to the key input by the keyboard (KBD) 1 is reduced and the misoperation is prevented and the operation efficiency is improved.

While the scroll marks are indicated on the right edge of the display screen in the embodiment, they may be located at any position on the display screen.

As described hereinabove, the present invention releases the operator from the troublesome manipulation due to the remote keyboard from the display and provides the information processing apparatus which is easy to use even for an unexperienced person without misoperation and with a variable scroll velocity which is attained by one finger.

What we claim is:

1. An electronic apparatus comprising:
   display means having a display screen for displaying data;
   scrolling means for scrolling said data displayed on said display means in a predetermined direction;
   transparent coordinate input means superimposed on said display screen of said display means for receiving input data;
   determination means, responsive to actuation of a predetermined position on said transparent coordinate input means, for determining a direction of movement of the data to be scrolled by said scrolling means and for determining a distance of movement of the data to be scrolled by said scrolling means based upon the input data received by said transparent coordinate input means in accordance with variation of the coordinate corresponding to actuation of the position on said coordinate input means; and
   control means for inhibiting said scrolling means from scrolling when the scroll direction determined by said determination means is different from said predetermined direction.

2. An electronic apparatus according to claim 1, wherein said display means comprises a liquid crystal display.

3. An electronic apparatus comprising:
   display means having a display screen for displaying data;
   transparent coordinate input means superimposed on said display screen of said display means for receiving input data;
   mark display means for displaying a mark indicating a scrolling direction of said data on said display screen of said display means; and
   scrolling means, operating in accordance with the actuation of a position corresponding to the mark on said transparent coordinate input means, for determining a direction of scrolling of the data displayed on said display screen of said display means and for determining a distance of scrolling of the data displayed on said display screen based upon the input data received by said transparent coordinate input means in accordance with variation of the coordinate corresponding to actuation of the position of said coordinate input means, so as to effect scrolling of the data.

4. An electronic apparatus according to claim 3 wherein said mark comprises two arrow marks for indicating an upward direction and a downward direction.

5. An electronic apparatus according to claim 3 wherein said scrolling means changes a scrolling velocity in accordance with the velocity of actuation of the switches at said position of said mark.

6. An electronic apparatus according to claim 3 wherein said transparent coordinate input means comprises a three layer laminated construction including a vertical direction electrode sheet, a spacer, and a horizontal direction electrode sheet.

7. An electronic apparatus according to claim 3, wherein said display means comprises a liquid crystal display.

8. An electronic apparatus comprising:

display means having a display screen for displaying data;

transparent coordinate input means superimposed on said display screen of said display means for receiving input data; and scrolling means, operating in accordance with the actuation of a position of said coordinate input means which corresponds to a predetermined position on said display screen of said display means, for determining a direction of scrolling of said data displayed on said display screen of said display means and for determining a distance of scroll of said data displayed on said display screen based upon the input data received by said transparent coordinate input means in accordance with variation of the coordinate corresponding to actuation of the position of said coordinate input means so as to effect scrolling of the data.

9. An electronic apparatus according to claim 8 wherein said display means displays a mark for indicating a scrolling direction.

10. An electronic apparatus according to claim 9 wherein a display position of said mark corresponds to a predetermined position of said input means.

11. An electronic apparatus according to claim 9 wherein said mark is displayed on right edge of said display means.

12. An electronic apparatus according to claim 8, wherein said display means comprises a liquid crystal display.

13. An electronic apparatus comprising:
display means having a display screen for displaying data;

transparent coordinate input means superimposed on said display screen of said display means for receiving input data;

mark display means for displaying a plurality of marks indicating different scrolling directions of said data on said display screen of said display means; and control means, operating in accordance with the actuation of one of a plurality of positions of said transparent coordinate input means which corresponds to said marks displayed by said mark display means, for determining a scrolling direction of said data in response to a type of the actuated mark and for determining a scrolling distance of said data based upon the input data received by said transparent coordinate input means in accordance with variation of the coordinate corresponding to actuation of the position of said coordinate input means so as to effect scrolling of the data.

14. An electronic apparatus according to claim 13, wherein said display means comprises a liquid crystal display.

15. An electronic apparatus comprising:
display means having a display screen for displaying data;

display control means for displaying information indicating a direction of scroll of said data on a display screen of said display means and for receiving input data; and scroll control means operating in accordance with the actuation of a position of the information displayed by said display means for determining a scrolling direction of said data, for detecting variation of actuation of a position of the information indicating a direction of scroll of said data and for determining a scrolling distance of said data based upon the input data received by said display control means so as to effect scrolling of the data.

16. An electronic apparatus according to claim 15, further comprising a transparent touch panel for indicating said displayed information being superimposed on said display screen.

17. An electronic apparatus according to claim 16, wherein said mark display means displays a plurality of arrow marks for indicating said scrolling directions of said data.

18. An electronic apparatus according to claim 15, wherein said display control means further displays an arrow mark for indicating a scrolling direction.

19. An electronic apparatus according to claim 15, wherein said display means comprises a liquid crystal display.

* * * * *

UNITED STATES PATENT AND TRADEMARK OFFICE
CERTIFICATE OF CORRECTION

PATENT NO. : 4,954,967

DATED : September 4, 1990

INVENTOR(S) : Hiroshi Takahashi

It is certified that error appears in the above-identified patent and that said Letters Patent is hereby corrected as shown below:

ON TITLE PAGE:

Before "[30] Foreign Application Priority Data",

Insert:

--[63]   Related U.S. Application Data:

Continuation of application Serial No. 133,256, filed Dec. 14, 1987, which is a continuation of application Serial No. 648,956, filed Sept. 10, 1984, both now abandoned.--

UNITED STATES PATENT AND TRADEMARK OFFICE
CERTIFICATE OF CORRECTION

PATENT NO. : 4,954,967
DATED : September 4, 1990
INVENTOR(S) : Hiroshi Takahashi It is certified that error appears in the above-identified patent and that said Letters Patent is hereby corrected as shown below:

COLUMN 3:

Line 18, "increse" should read --increase--.

Line 31, "ocurred," should read --occurred,--.

COLUMN 5:

Line 12, "scroll" should read --scrolling--.

COLUMN 6:
   Line 33, "claim 16," should read --claim 13,--.

Signed and Sealed this

Twenty-first Day of May, 1991

Attest:

HARRY F. MANBECK, JR.

Attesting Officer      Commissioner of Patents and Trademarks